Figure 1:
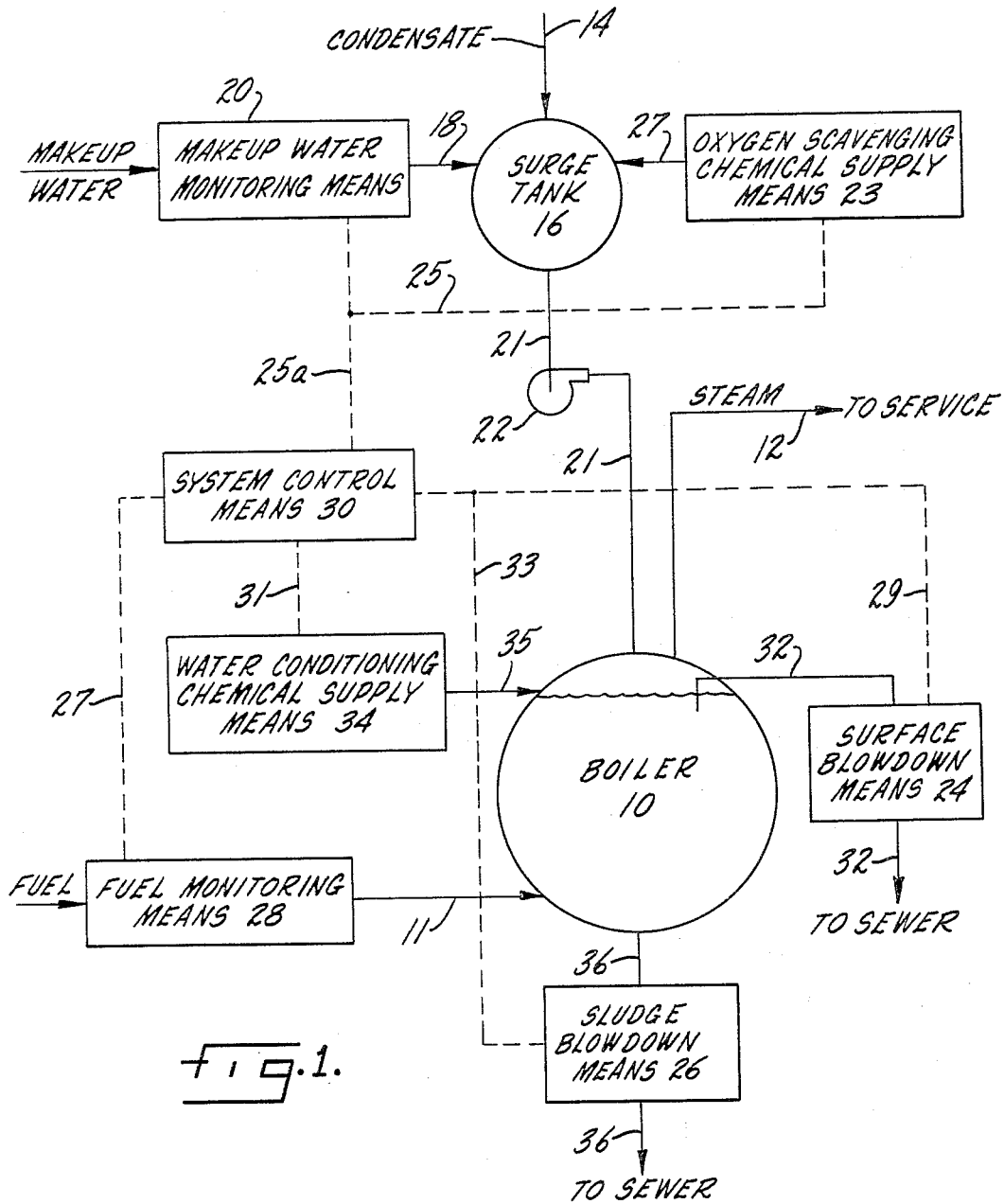

April 16, 1968  F. H. HORNE  3,377,994

STEAM GENERATING SYSTEM

Filed Aug. 17, 1966  2 Sheets-Sheet 2

INVENTOR.
Frederick H. Horne,
BY
Hume, Groen, Clement & Hume
Attorneys.

United States Patent Office 3,377,994
Patented Apr. 16, 1968

3,377,994
STEAM GENERATING SYSTEM
Frederick H. Horne, 541 Prospect Ave.,
Lake Bluff, Ill. 60044
Filed Aug. 17, 1966, Ser. No. 579,464
21 Claims. (Cl. 122—382)

The invention relates to a steam generating system and, more particularly, in a steam generating system to a method and apparatus for controlling the removal of impurities from the boiler or the addition of chemical treating agents to the boiler, or both.

Steam generating systems conventionally include a boiler and a surge tank which stores the feedwater that is pumped to the boiler upon demand. The steam condensate from the system is returned to the surge tank. However, makeup water is added to the surge tank to make up for any loss of steam and steam condensate in the system. As is well known in the art the makeup water introduces three types of impurities to the system: (1) dissolved solid impurities, (2) undissolved or suspended solid impurities, and (3) dissolved gases. The suspended solid impurities comprise mud, sludge, silt and organic matter. The dissolved solid impurities include carbonates, bicarbonates, sulfates, nitrates and chlorides of calcium and magnesium and other base metals. Dissolved oxygen, carbon dioxide and hydrogen are also impurities in the makeup water.

As is well known in the art, oxygen scavenging chemicals and water conditioning chemicals are added to the surge tank or the boiler, or both, to scavenge the gas and precipitate or condition the dissolved solid impurities. Most remaining dissolved solid impurities, such as salts in any form, rise close to the surface of the water in the boiler while most suspended solid impurities and precipitated solid impurities settle to the bottom of the boiler. It is a customary practice to periodically remove the impurities at the surface of the boiler water by drawing off liquid just below the water line of the boiler water and discharging it to the sewer. This procedure is commonly referred to as "surface blowdown" or "dissolved solids blowdown." The precipitated solid and sludge impurities are also periodically withdrawn from the bottom of the boiler and discharged to the sewer. This is commonly referred to as the "sludge blowdown" or "precipitated solids blowdown."

Heretofore, it has been the practice to initiate the surface blowdown after the boiler water had reached a predetermined impurity level analyzed by chemical or electrical means. Once the water has reached a predetermined impurity level the surface blowdown was initiated automatically or manually. If the impurity content is measured periodically, the system is not responsive to changes which occur between measurements. If the impurity content is measured continuously the system responds too late since it responds after the impurity level has reached a particular level rather than when it reaches this level.

Initiation of surface blowdown has also been based upon the amount of raw water fed to the surge tank. In such a system surface blowdown is automatically initiated after a predetermined amount of raw water has been fed to the surge tank. This system has a distinct disadvantage. It does not take into consideration whether the impurities have reached the boiler, since there is often a considerable time delay between the raw water entering the surge tank and passing from the surge tank to the boiler. Accordingly, the surface blowdown may not remove the impurities which it is intended to remove because they have not reached the boiler.

With respect to the sludge blowdown it has been a common practice to effect it at predetermined intervals; for example, once every shift of workers.

It is desirable to provide in a steam generating system a method and apparatus for controlling the surface blowdown or sludge blowdown, or both, of the boiler which considers the impurities accumulating in the boiler without having to analyze the boiler water.

It is therefore an object of the present invention to provide a method and apparatus for controlling the surface blowdown or sludge blowdown, or both, of a boiler or a plurality of boilers in a steam generating system.

It is a further object to provide a method and apparatus for controlling the addition of chemicals added to the boiler in a steam generating system.

It is a still further object to provide a method and apparatus for controlling the removal of impurities from a boiler in a steam generating system.

It is another object to provide a method and apparatus for controlling the surface blowdown or sludge blowdown, or both, of a boiler in a steam generating system which takes into consideration the impurities accumulating in the boiler without having to analyze the boiler water.

Figure 2:
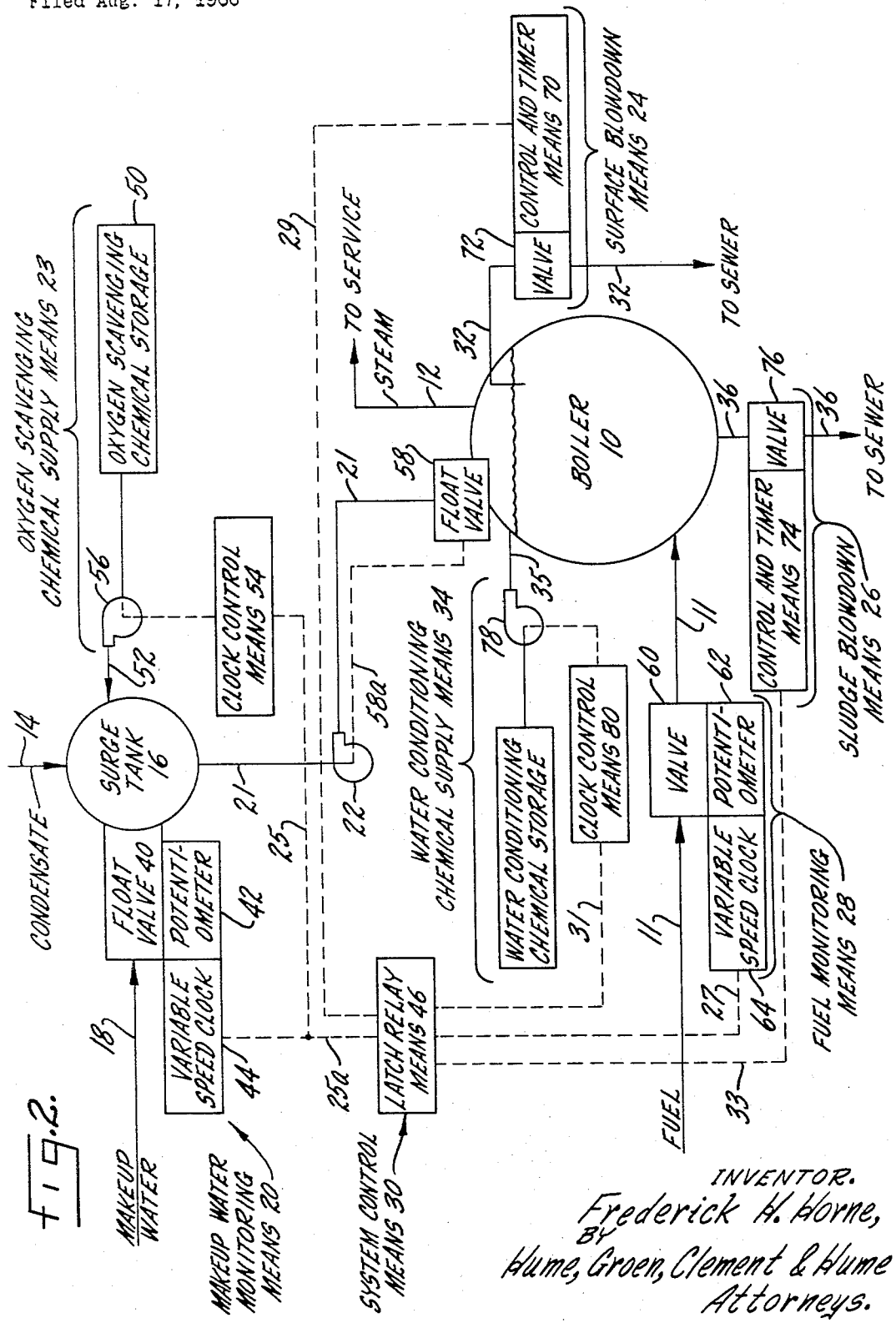

The invention, both as to its organization and method of operation, taken with further objects and advantages thereof, will best be understood by reference to the following description taken in conjunction with the accompanying drawings, in which:

FIGURE 1 is a schematic diagram of a steam generating system embodying the present invention; and FIGURE 2 is a more detailed schematic diagram of the steam generating system of FIGURE 1.

Referring now to FIGURE 1 there is illustrated diagrammatically a steam generating system embodying the features of the present invention. As in conventional steam generating systems there is a boiler 10 heated by suitable fuel fed through line 11 to generate steam delivered to service through line 12. The steam after use is passed through a condenser and steam condensate delivered to a surge tank 16 through a line 14. Steam and condensate losses occur in the system due to process uses, leakage and the like. Accordingly, makeup water, i.e., raw or pre-treated water, must be added to the system and, to these ends, makeup water is added to the surge tank 16 through line 18.

In accordance with the present invention the impurity content of the makeup water is analyzed by any known technique, the selection of which would be within the ordinary skill of one in the art. Furthermore, a makeup water monitoring means 20 measures the amount of makeup water added to the system. The makeup water monitoring means 20 is electrically connected to an oxygen scavenging chemical supply means 23 and a system control means 30 as illustrated diagrammatically by lines 25 and 25a. When the boiler 10 needs additional water a pump 22 is actuated passing feedwater, i.e., a mixture of condensate water and makeup water, from the surge tank 16 through a line 21 into the boiler 10.

The makeup water added to the surge tank 16 contains dissolved solid impurities, undissolved solid impurities and dissolved gaseous impurities discussed hereinbefore and well known in the art. It is preferable to add the oxygen scavenging chemicals, such as sodium sulfate, hydrazine or the like, to the surge tank 16. Accordingly, the oxygen scavenging chemical supply means 23, which is responsive to the makeup water monitoring means 20 as illustrated diagrammatically by line 25 is connected to the surge tank 16 by line 27. After a predetermined amount of makeup water has passed through the line 18 and into the surge tank 16, the makeup water monitoring means 20 actuates the system control means 30 and the oxygen scavenging chemical supply means 23, which delivers a predetermined quantity of oxygen scavenging chemical through the line 27 to the surge tank 16. The quantity of oxygen scavenging chemical will, of course, be dependent upon the impurity content of the makeup water and the quantity of makeup water delivered to the surge tank 16. Oxygen scavenging chemical is periodically supplied every time the predetermined quantity of makeup water is added to the system.

When the feedwater is passed to the boiler 10 the impurities added by the makeup water are transferred to the boiler 10 and accumulate therein as the feedwater is converted to steam. Surface blowdown means 24 and sludge blowdown means 26 are provided to periodically remove these impurities from the boiler 10.

In accordance with the present invention the steam generating system has fuel monitoring means 28 to measure the amount of fuel fed to the boiler 10 through line 11. When a predetermined amount of fuel has passed to the boiler 10 through line 11 the fuel monitoring means 28 will signal the system control means 30, which is electrically connected to the surface blowdown means 24, a water conditioning chemical supply means 34 and the sludge blowdown means 26 as illustrated diagrammatically by lines 29, 31 and 33, respectively. If the system control means 30 has already been signalled by the makeup water monitoring means 20, then it will actuate the surface blowdown means 24, water conditioning chemical supply means 34 and sludge blowdown means 26. Otherwise they will not be actuated until the system control means 30 is signalled by the makeup water monitoring means 20 also. The water conditioning chemical supply means 34 is adapted upon actuation to pass a predetermined quantity of water conditioning chemicals, such as polyphosphates, sodium aluminate, caustic soda, soda ash or the like, which is well known in the art and the selection of which would be within the ordinary skill of one in the art, to the boiler 10 through line 35. The surface blowdown means 24 upon actuation causes a surface blowdown of the boiler 10 for a predetermined time. The liquid withdrawn from the boiler 10 during surface blowdown is directed to the sewer through a line 32.

The sludge blowdown means 26 does not operate every time it is actuated since it is generally not necessary to have sludge blowdown every time there is a surface blowdown. Accordingly, the sludge blowdown means 26 will count this cycle and after a predetermined number of cycles will effect a sludge blowdown which sends the sludge to waste through line 36.

The system in accordance with the present invention takes into consideration both the amount of impurities that have been added to the system and when these impurities have accumulated in the boiler 10. With the knowledge of the impurity content of the makeup water, the quantity of makeup water that will bring in a predetermined quantity of impurities may be calculated. However, until the makeup water has been transferred to the boiler there is no need for blowdown. The accumulation of impurities in the boiler is determined in accordance with the present invention by the amount of heat used in the boiler. Heat consumption means that steam is being generated and therefore feedwater is necessary from the surge tank 16. Accordingly, after a predetermined amount of fuel, the B.t.u. content of which is determined by means well known to one with ordinary skill in the art, has been used in the boiler and a predetermined amount of makeup water added to the surge tank, a known amount of impurities have been added to the boiler. Accordingly, knowing the amount of impurities that can be permitted to accumulate in the boiler 10, the impurity content of makeup water and the B.t.u. content of the fuel, the predetermined amounts of makeup water and fuel that are permissible before actuation of the surface blowdown means 24, the sludge blowdown means 26 and the water conditioning chemical supply means 34 through the system control means 30 may be calculated.

Referring now to FIGURE 2 the system for controlling surface and sludge blowdown in accordance with the present invention will be discussed in more detail. The makeup water monitoring means 20 which controls the amount of makeup water being added to the surge tank 16 through the line 18 comprises a float valve 40, a potentiometer 42 and a variable speed clock 44. If there is not sufficient condensate water returning to the surge tank 16 through the condensate line 14 to compensate for the feedwater drawn off for the boiler 10 the liquid level in the surge tank 16 will drop. The valve 40 opens in response to this drop in liquid level and makeup water enters the surge tank 16 through line 18 until a predetermined liquid level has been reached. The valve 40 then starts to close automatically and the flow of makeup water to the surge tank 16 is reduced or terminated.

The amount of makeup water, the impurity content of which has been analyzed by any known method, passed into the surge tank 16 is measured by the potentiometer 42 associated with the float valve 40. As the flow rate through the valve 40 varies the potentiometer will vary the voltage to the variable speed clock 44. In this manner the quantity of makeup water passed into the surge tank 16 is converted into an amount of electricity which is passed to the variable speed clock 44. After the clock 44 has made a revolution, i.e., after a predetermined amount of makeup water has been added to the surge tank 16, the variable speed clock 44 sends an impulse to the latch relay means 46 of the system control means 30 through an electrical line illustrated diagrammatically by line 25a.

The variable speed clock 44 also sends an impulse through an electrical line illustrated diagrammatically by line 25 to the oxygen scavenging chemical supply means 23 to initiate the addition of oxygen scavenging chemicals to the surge tank 16. To these ends the oxygen scavenging chemical supply means 23 includes an oxygen scavenging chemical storage means 50 containing the supply of liquid scavenging chemicals, such as sodium sulfite, hydrazine or the like. The scavenging chemical storage tank 50 is connected to the surge tank 16 by line 52 having a pump 56 with clock control means 54. The electrical impulse from the variable speed clock 44 actuates the clock control means 54 which turns on the pump 56 causing oxygen scavenging chemicals to be transferred to the surge tank 16. The clock control means 54 automatically stops the pump 56 after it has pumped for a predetermined time and therefore a predetermined amount of oxygen scavenging chemicals has been transferred to the surge tank 16. In this manner, after a predetermined quantity of makeup water is fed to the surge tank 16 a predetermined amount of oxygen scavening chemical is automatically added to the surge tank.

The demands of the boiler 10 for feedwater are controlled by a float valve 58 which is connected to the pump 22 as illustrated diagrammatically by line 58a. If the liquid level in the boiler 10 drops below a predetermined level the valve 58 will open and actuate the pump 22 so that feedwater will pass through line 21 into the boiler 10. This continues until the liquid level has risen to a predetermined upper level whereupon the valve 58 is closed or starts to close and the pump 22 turned off, or bypassed.

Steam is generated by the heat given off upon combustion of the fuel in the boiler 10. The fuel enters the boiler 10 through line 11 and fuel monitoring means 28 comprising a valve 60, potentiometer 62 and variable speed clock 64. The quantity of fuel entering the boiler 10 is measured electrically through the potentiometer 62 associated with the valve 60. As the fuel flow through the valve 60 increases the potentiometer increases the voltage to a variable speed clock 64 and vice versa. After a predetermined quantity of fuel has passed through the valve 60 and into the boiler 10 the variable speed clock 64 will have made a revolution and will send an impulse to the latch relay means 46 through an electrical line illustrated diagrammatically by line 27.

Assuming that the latch relay means 46 has already received an impulse from the variable speed clock 44 associated with the makeup water fed to the surge tank 16 the latch relay means 46 will then send impulses to the dissolved solids blowdown means 24, the sludge blowdown means 26, and the water conditioning chemical supply means 34. If, on the other hand, the latch relay means 46 has not received an impulse from the variable speed clock 44 nothing will occur until such an impulse is received. In accordance with the present invention the dissolved solids blowdown, sludge blowdown, and the addition of chemicals to the boiler, or any of them, are not effected until a predetermined amount of makeup water has been added to the surge tank 16 and a predetermined quantity of fuel has been supplied to the boiler 10. Therefore dissolved solids blowdown and the sludge blowdown will not be effected until a predetermined quantity of impurities entering the system with the raw water have reached the boiler 10.

Once the latch relay means 46 has received impulses from both the variable speed clock 44 and the variable speed clock 64 impulses are sent to the dissolved solids blowdown means 24, the sludge blowdown means 26 and the water conditioning chemical supply means 34. The dissolved solids blowdown means 24 comprises a control and timer means 70 and a valve 72. Upon actuation by the latch relay means 46 the control and timer means 70 opens the valve 72 whereby liquid from the upper level of the boiler 10 is withdrawn through line 32 and passed to the sewer. This blowdown or drainage continues until a predetermined quantity of liquid has been removed from the boiler. The control and timer means 70 automatically terminates the surface blowdown by closing the valve 72.

The sludge blowdown means 26 comprises a control and timer means 74 and a valve 76. Sludge blowdown is effected less frequently than dissolved solids blowdown and the sludge blowdown means 26 will be actuated upon a predetermined number of dissolved solids blowdowns having been effected. Accordingly, the impulse sent to the sludge blowdown means 24 by the latch relay means 46 is counted by the control and timer means 74. After the control and timer means 74 has received the predetermined number of impulses it automatically opens the valve 76 and sludge is drained from the boiler 10 through line 36 and passed to the sewer. The control and timer means 74 automatically closes the valve 76 at the end of the sludge blowdown cycle.

The water conditioning chemical supply means 34 is also controlled by the latch relay means 46 and comprises a water conditioning chemical storage means 84 and a pump 78 with clock control means 80. The impulse from the latch relay means 46 passes to the clock control means 80 which thereby actuates the pump 78 causing it to pump water conditioning chemicals from the storage means 84 through line 35 into the boiler 10. After a predetermined time and therefore a predetermined quantity of water conditioning chemicals has been fed to the boiler 10, the clock control means 80 deactivates the pump 78.

In accordance with the present invention feedwater monitoring means may be substituted for the fuel monitoring means 28. Knowing the amount of makeup water added to the surge tank and its impurity content and the amount of feedwater passed to the boiler 10, the amount of impurities being passed to the boiler 10 may be calculated. Furthermore, if surface blowdown, sludge blowdown or the addition of water conditioning chemicals is to be effected after a predetermined amount of impurities have accumulated in the boiler 10, the amount of makeup water added to the surge tank and the amount of feedwater passed to the boiler may be predetermined so that when the desired impurity level is reached these operations are effected. In effect, therefore, the system would be basically the same as that previously discussed in relation to FIGURES 1 and 2 with the exception that the amount of makeup water passed to the surge tank will be correlated with the amount of feedwater passed to the boiler rather than the amount of fuel passed to the boiler. The monitoring means used to measure the amount of feedwater passed to the boiler would, for example, be substantially similar to the fuel monitoring means or the makeup water monitoring means. In other words, the float valve 58 would have associated therewith a potentiometer and variable speed clock and after the clock will have made a revolution an impluse would be sent to the latch relay means 46 which would send impulses to the surface blowdown means 24, sludge blowdown means 26 and water conditioning chemical supply means 34 as previously discussed. The system is otherwise the same as that shown in FIGURES 1 and 2.

Furthermore, instead of measuring the fuel passed to the boiler 10 essentially the same result can be achieved by utilizing the variation in pressure in the boiler 10. For example, if the boiler operates at 125 p.s.i.g. the pressure will stay at this value until steam is withdrawn from the boiler and then the pressure will drop. Additional steam is generated until the pressure remains to 125 p.s.i.g. While generating this steam the boiler is, of course, being heated and receiving additional feedwater. Accordingly, the length of time and the pressure to which the boiler has dropped has a direct relationship to the amount of feedwater added to the boiler and when coupled with the amount of raw water being added to the surge tank 16 permits one to determine the amount of impurities added to the boiler 10. Therefore the time and pressure differential may be correlated with the amount of makeup water in the same manner as the amount of feedwater or the amount of fuel passed to the boiler 10 as disscussed hereinbefore.

Suitable means, for example, of converting the time and pressure differential into an electrical impulse would include a pressure diaphram and gauge, a potentiometer and a variable speed clock. The potentiometer would vary the voltage to the variable speed clock dependent upon the pressure differential between the boiler and its operating pressure. After the clock has rotated a revolution it sends an electrical impulse to the latch relay means 46 in the same manner as the fuel monitoring means 28 discussed hereinbefore. In all other respect the system would be the same as previously described.

The specific means described herein in connection with the makeup water monitoring means 20, system control means 30, fuel monitoring means 28, surface blowdown means 24, sludge blowdown means 26, water conditioning chemical supply means 34 and oxygen scavenging chemical supply means 23 are merely illustrative of many different types of equipment that could be utilized to perform these functions of the present invention. The selection of the specific instrumentation means and the like would be within the ordinary skill of one in the art. Furthermore, though the control system described and illustrated is basically an electrical system it will be understood that a pneumatic or mechanical system could also be employed if desired.

As will be readily understood by one with ordinary skill in the art the oxygen scavenging chemicals may be added to the deaerator (not shown), the water storage tank, the line from the surge tank to the boiler or in the boiler of the steam generating system. Furthermore, it will be readily understood that the water conditioning chemicals may be added, if desired, to the water in the surage tank or to the water as it is passing from the surge tank to the boiler.

While the embodiments described herein are at present considered to be preferred, it will be understood that various modifications and improvements may be made therein and it is intended to cover in the appended claims all such modifications and improvements as fall within the true spirit and scope of the invention.

What is claimed is:

1. In a steam generating system including a surge tank and a boiler with surface blowdown means, said surge tank receiving steam condensate from said system and makeup water added to said system to form feedwater for said boiler, and means to pass said feedwater from said surge tank to said boiler, the improvement comprising means for measuring the amount of makeup water passed to said surge tank, means for measuring the amount of fuel passed to said boiler and means for actuating said surface blowdown means after a predetermined amount of makeup water has been passed to said surge tank and a predetermined amount of fuel has been passed to said boiler in response to said means for measuring the makeup water and said means for measuring the fuel.

2. In the steam generating system of claim 1, said boiler having sludge blowdown means actuated by said means for actuating said surface blowdown means.

3. In the steam generating system of claim 1 wherein said means for actuating said surface blowdown means actuates the addition of chemical treating agents to the boiler.

4. In a steam generating system including a surge tank and a boiler with surface blowdown means, said surge tank receiving steam condensate from said system and makeup water added to said system to form feedwater for said boiler, and means to pass said feedwater from said surge tank to said boiler, the improvement comprising means for measuring the amount of makeup water passed to said surge tank, means for measuring the amount of feedwater passed to said boiler and means to actuate said surface blowdown means after a predetermined amount of makeup water has been passed to said surge tank and a predetermined amount of feedwater has been passed to said boiler in response to said means for measuring the makeup water and said means for measuring the feedwater.

5. In the steam generating system of claim 4 said boiler having sludge blowdown means actuated by said means for actuating said surface blowdown means.

6. In the steam generating system of claim 1 wherein said means for actuating said surface blowdown means actuates the addition of chemical treating agents to the boiler.

7. In a steam generating system including a surge tank and a boiler with surface blowdown means, said boiler having an operating pressure, said surge tank receiving steam condensate from said system and makeup water added to said system to form feedwater for said boiler, and means to pass said feedwater from said surge tank to said boiler, the improvement comprising means for measuring the amount of makeup water passed to said surge tank, means for measuring the time and difference in the pressure of the boiler and its operating pressure and means to actuate said surface blowdown means after a predetermined amount of makeup water has been passed to said surge tank and a predetermined time and pressure differential has occurred with respect to said boiler in response to said means for measuring the makeup water and means for measuring the time and pressure differential.

8. In the steam generating system of claim 7, said boiler having sludge blowdown means actuated by said means for actuating said surface blowdown means.

9. In the steam generating system of claim 1 wherein said means for actuating said surface blowdown means actuates the addition of chemical treating agents to the boiler.

10. In a steam generating system including a surge tank and a boiler with surface blowdown means, said surge tank receiving steam condensate from said system and makeup water added to said system to form feedwater for said boiler, and means to pass said feedwater from said surge tank to said boiler, the improvement comprising determining the impurity content of said makeup water, measuring the amount of makeup water passed to said surge tank, measuring the amount of fuel passed to said boiler and actuating said surface blowdown means after a predetermined amount of makeup water has been passed to said surge tank and a predetermined amount of fuel has been passed to said boiler in response to measuring said makeup water and said fuel.

11. In the steam generating system of claim 10 wherein said boiler has sludge blowdown means, actuating said sludge blowdown means also after a predetermined amount of makeup water has been passed to said surge tank and a predetermined amount of fuel has been passed to said boiler in response to measuring said makeup water and said fuel.

12. In the stream generating system of claim 10 wherein said boiler has means for adding chemical treating agents thereto, actuating said means for adding chemical treating agents to the boiler after a predetermined amount of makeup water has been passed to said surge tank and a predetermined amount of fuel has been passed to said boiler in response to measuring said makeup water and said fuel.

13. In a steam generating system including a surge tank and a boiler with surface blowdown means, said surge tank receiving steam condensate from said system and makeup water added to said system to form feedwater for said boiler, and means to pass said feedwater from said surge tank to said boiler, the improvement comprising measuring the impurity content of said makeup water, measuring the amount of makeup water passed to said surge tank, measuring the amount of feedwater passed to said boiler and actuating said surface blowdown means after a predetermined amount of makeup water has been passed to said surge tank and a predetermined amount of feedwater has been passed to said boiler in response to measuring said makeup water and said feedwater.

14. In the steam generating system of claim 13 wherein said boiler has sludge blowdown means, actuating said sludge blowdown means also after a predetermined amount of makeup water has been passed to said surge tank and a predetermined amount of feedwater has been passed to said boiler in response to measuring said makeup water and said feedwater.

15. In the steam generating system of claim 13 wherein said boiler has means for adding chemical treating agents thereto, actuating said means for adding chemical treating agents to the boiler after a predetermined amount of makeup water has been passed to said surge tank and a predetermined amount of feedwater has been passed to said boiler in response to measuring said makeup water and said feedwater.

16. In a steam generating system including a surge tank and a boiler with surface blowdown means, said boiler having an operating pressure, said surge tank receiving steam condensate from said system and makeup water added to said system to form feedwater for said boiler, and means to pass said feedwater from said surge tank to said boiler, the improvement comprising measuring the impurity content of said makeup water, measuring the amount of makeup water passed to said surge tank, measuring the time and difference in the pressure of the boiler and its operating pressure, and actuating said surface blowdown means after a predetermined amount of makeup water has been passed to said surge tank and a predetermined time and pressure differential has occurred with respect to said boiler in response to measuring the makeup water and the time and pressure differential in said boiler.

17. In the steam generating system of claim 16 wherein said boiler has sludge blowdown means, actuating said sludge blowdown means also after a predetermined amount of makeup water has been passed to said surge tank and a predetermined time and difference in pressure in the boiler in response to measuring said makeup water and said time and pressure.

18. In the steam generating system of claim 16 wherein said boiler has means to add chemical treating agents thereto, actuating said means for adding said chemical treating agents with said surface blowdown means.

19. In a steam generating system including a surge tank and a boiler with surface blowdown means, said surge tank receiving steam condensate from said system and makeup water added to said system to form feedwater for said boiler, and means to pass said feedwater from said surge tank to said boiler, the improvement comprising determining the impurity content of said makeup water, measuring the amount of makeup water passed to said surge tank, measuring the amount of heat capacity units passed to said boiler and actuating said surface blowdown means after a predetermined amount of makeup water has been passed to said surge tank and a predetermined amount of heat capacity units has been passed to said boiler in response to measuring said makeup water and said heat capacity units.

20. In the steam generating system of claim 19 wherein said boiler has sludge blowdown means, actuating said sludge blowdown means also after a predetermined amount of makeup water has been passed to said surge tank and a predetermined amount of heat capacity units has been passed to said boiler in response to measuring said makeup water and said heat capacity units.

21. In the steam generating system of claim 19 wherein said boiler has means for adding chemical treating agents thereto, actuating said means for adding chemical treating agents to the boiler after a predetermined amount of makeup water has been passed to said surge tank and a predetermined amount of heat capacity units has been passed to said boiler in response to measuring said makeup water and said heat capacity units.

References Cited

UNITED STATES PATENTS

| | | |
|---|---|---|
| 1,913,195 | 6/1933 | Donaldson et al. |
| 1,971,338 | 8/1934 | Contant. |
| 2,292,023 | 8/1942 | Dickey. |
| 2,294,501 | 9/1942 | Junkins _____ 122—1 |
| 2,358,380 | 9/1944 | Butzler. |
| 2,851,016 | 9/1958 | Kinderman. |
| 2,921,564 | 1/1960 | Mattox. |
| 2,964,024 | 12/1960 | Kaufman et al. |
| 3,064,630 | 11/1962 | Profos _____ 122—379 |
| 3,139,071 | 6/1964 | Rivers. |

KENNETH W. SPRAGUE, *Primary Examiner.*